United States Patent [19]

Kodama

[11] Patent Number: 4,901,228
[45] Date of Patent: Feb. 13, 1990

[54] PIPELINED CACHE SYSTEM USING BACK UP ADDRESS REGISTERS FOR PROVIDING ERROR RECOVERY WHILE CONTINUING PIPELINE PROCESSING

[75] Inventor: Takashi Kodama, Kamakura, Japan

[73] Assignee: Mitsubishi Denki K.K., Tokyo, Japan

[21] Appl. No.: 73,513

[22] Filed: Jul. 15, 1987

[30] Foreign Application Priority Data

Jul. 17, 1986 [JP] Japan .................................. 61-168420

[51] Int. Cl.⁴ ..................... G06F 9/38; G06F 13/36; G06F 11/14
[52] U.S. Cl. ................................. 364/200; 364/231.8; 364/265; 364/266.3
[58] Field of Search ... 364/200 MS File, 900 MS File; 371/37, 38, 10, 12, 14, 38, 41

[56] References Cited

U.S. PATENT DOCUMENTS

| | | | |
|---|---|---|---|
| 3,866,183 | 2/1975 | Lange | 364/200 |
| 4,048,236 | 4/1978 | Chelberg et al. | 364/200 |
| 4,167,782 | 9/1979 | Joyce et al. | 364/900 |
| 4,394,763 | 7/1983 | Nagano et al. | 371/10 |
| 4,439,829 | 3/1984 | Tsiang | 364/200 |
| 4,445,172 | 4/1984 | Peters et al. | 364/200 |
| 4,464,717 | 8/1984 | Keeley et al. | 364/200 |
| 4,502,110 | 2/1985 | Saito | 364/200 |
| 4,562,536 | 12/1985 | Keeley et al. | 364/200 |
| 4,566,103 | 1/1986 | Sato et al. | 371/12 |
| 4,608,687 | 8/1986 | Dutton | 371/10 |
| 4,694,454 | 9/1987 | Matsuura | 371/38 |

Primary Examiner—Raulfe B. Zache
Assistant Examiner—Malcolm G. Andrews
Attorney, Agent, or Firm—Kanesake & Takeuchi

[57] ABSTRACT

A cache memory includes an address back-up register for storing the physical address of the data where errors are generated for backing up the address register, a data array address back-up register for storing data address of the data where errors are generated for backing up the data array address register, and a request code back-up register for storing a preceding request code at the time of the error generation. When an error is detected by the system controller, data is read from the main memory according to the back-up registers and the control register, EYCY register and PSEDO ACK register, of the system controller.

7 Claims, 9 Drawing Sheets

PIPELINED CACHE SYSTEM USING BACK UP ADDRESS REGISTERS FOR PROVIDING ERROR RECOVERY WHILE CONTINUING PIPELINE PROCESSING

BACKGROUND OF THE INVENTION

1. Field of the Invention

This invention relates to a cache memory consisting of a small capacity, high speed memory provided for reducing the access time of the main memory.

2. Description of the Prior Art

A cache memory is generally provided between a CPU (processor) and a main memory for the purpose of reducing the access time when accessing the main memory. The CPU can access the cache memory at a high speed. The presence in the cache memory of data to be accessed is referred to as cache hit, while there is no data to be accessed is referred to as cache not hit. The data which has not recently been accessed (referred to) from the CPU although it has been stored in the cache memory, is expelled due to data which newly become necessary, and new data from the main memory is used to replace data in the cache memory.

At this time, the process where data is read out or written in the cache memory or main memory, is done through advanced control, and the speed of data processing by the CPU is increased through pipeline control which is done for parallel process of a plurality of commands.

Figure 7:
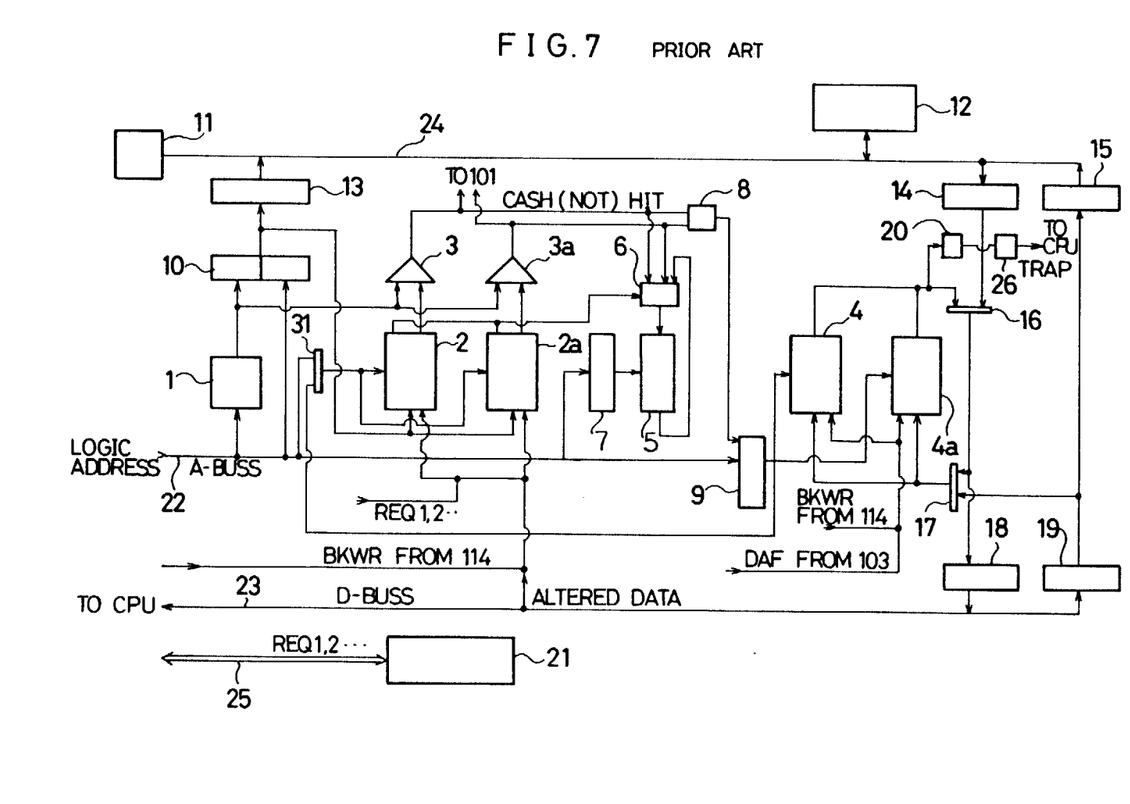
FIG. 7 is a block diagram showing a prior art cache memory.
Figure 8:
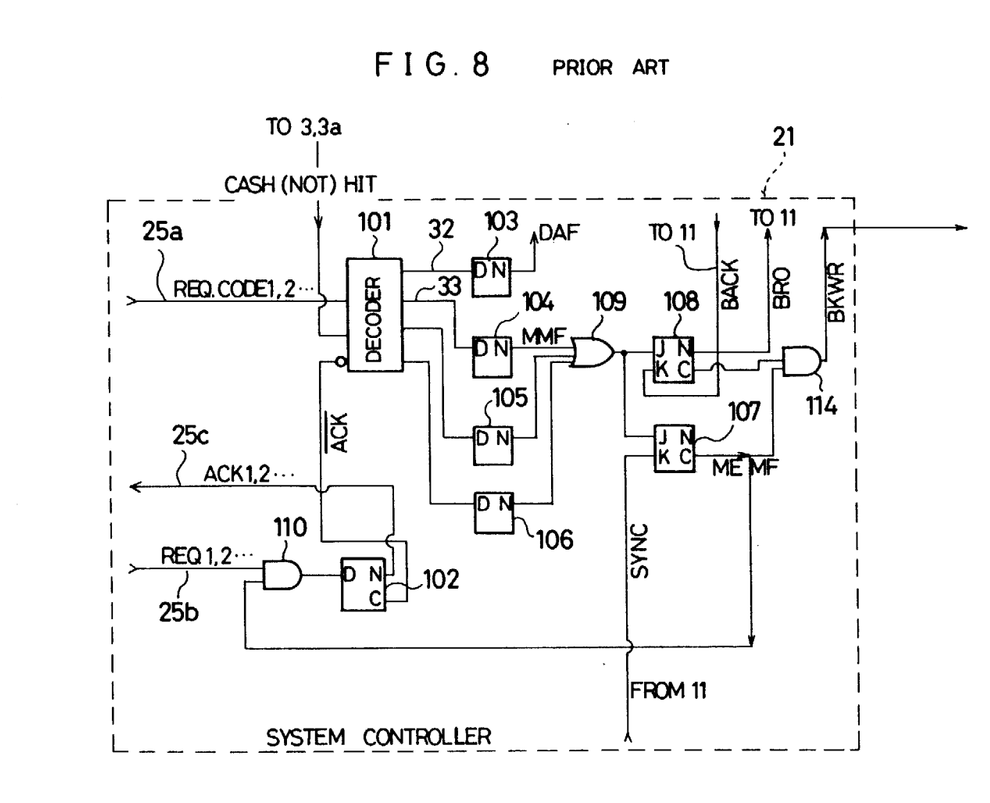
FIG. 8 is a circuit diagram showing a prior art system controller.

FIGS. 7 and 8 illustrate the construction of a prior art cache memory. FIG. 7 is a block diagram showing cache memories 2, 2a, 4 and 4a as high speed buffer memory used between the CPU and main memory 12, and FIG. 8 is a detailed block diagram showing a system controller shown in FIG. 7. The operations in the cache memory of such construction are roughly classified into two kinds, i.e., AA cycles AA1, AA2 and AA3 of the address description command corresponding to instructions REQ1, REQ2 and REQ3 and DA cycles DA1, DA2 and DA3 of data designation commands, as shown in FIG. 5.

Figure 6:
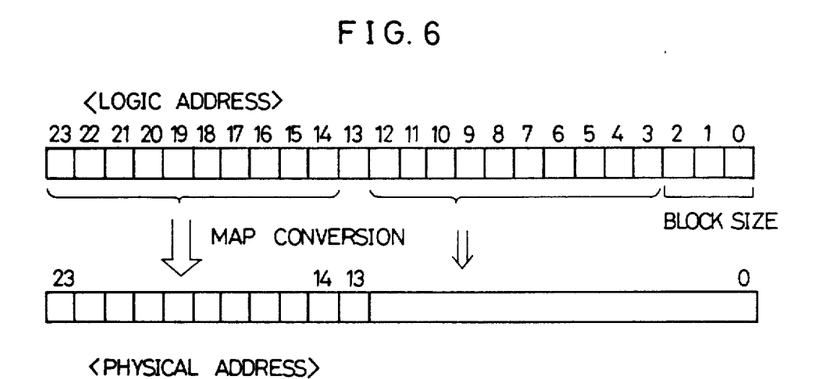
FIG. 6 is an address conversion diagram.

In the AA cycles a request signal REQ is supplied from the CPU to a bus line 25b of the cache memory, and address data (logical address) is supplied to a bus line (A-BUSS) 22. The address data has to be converted into actual address of the main memory due to imaginary addresses in the imaginary address space. In the MAP circuit 1, the, logical (imaginary) address is converted by mapping into the physical (real) address as shown in FIG. 6, and the comparator 3 or 3a checks whether the outputs of the MAP circuit 1 and address array 2 or 2a coincide with each other in the physical address.

In the DA cycle the data array 4 or 4a as the subject is detected according to physical address coincidence data obtained after the AA cycle completion, and operations of completing the reading or writing with respect to this data array are performed.

Figure 5:
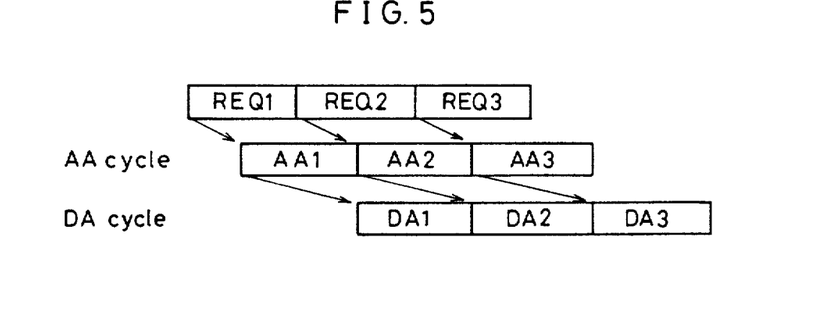
FIG. 5 is a pipeline control diagram of the cache memory.

As shown in FIG. 5 the advanced control of the commands REQ1→AA1→DA1 concurrently with the commands REQ2→AA2→DA2 which are subsequent processes timewise constitutes a pipeline control of the cache memory.

Figure 9:
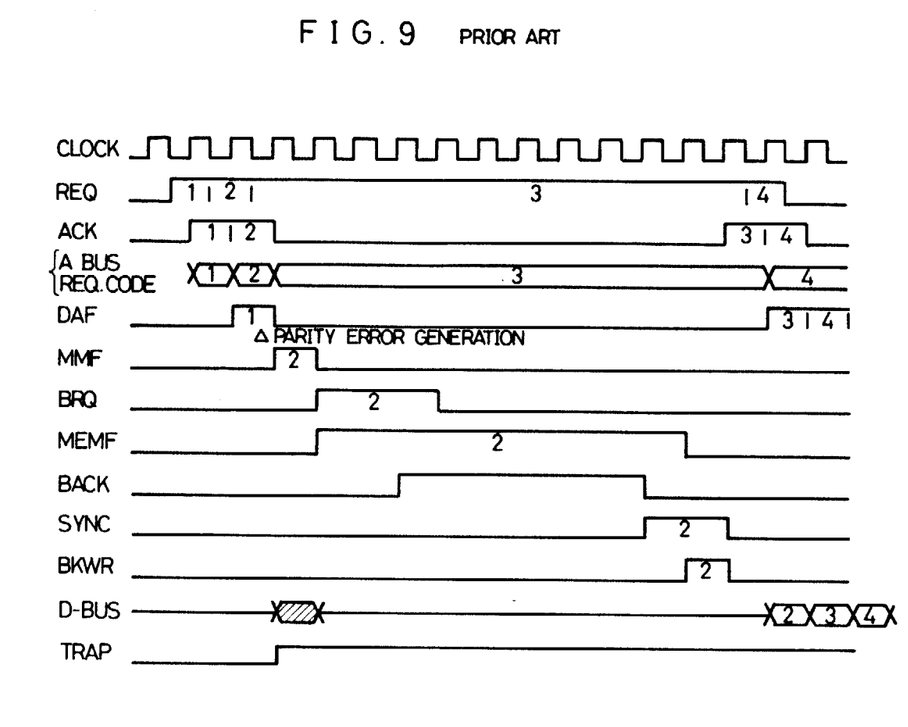
FIG. 9 is a prior art timing chart.

The prior art cache memory process operation will be explained according to the timing chart shown in FIG. 9. First, the clock is a reference clock signal in the cache memory. Now, when a request signal REQ1 is supplied from a CPU (not shown) to a bus line 25b of the system controller 21, the system controller 21 supplies a response to the CPU through the bus line 25c. In other words, an acknowledge signal ACK1 is provided to enter the AA1 cycle. At this time, a logical address is supplied to the MAP circuit 1 through a bus line 22.

The request signal REQ1 is also supplied to the address arrays 2 and 2a to provide a physical address stored therein. This address is compared with the converted physical address from the MAP circuit 1 in the comparator 3 or 3a. The address arrays 2 and 2a, comparators 3 and 3a and data arrays 4 and 4a are provided in pluralities in order to increase the capacity of the cache memory.

When a coincidence cache hit signal is supplied from the comparator 3 or 3a to the decoder 8, the address of the subject data array 4 or 4a corresponding to the address decoded is set in the data array address register 9.

This cache hit signal is supplied to the decision circuit 6 and rendered to be designation data with reference to the physical address from the address array 2 and 2a to be stored in the replace array 5. When the cache not hit signal to be described later is supplied from the comparator 3 or 3a, the designation data serves to make a decision as to whether the data of the data array 4 or 4a is to be replaced with the data of the main memory 12.

The data of the data arrays 4 and 4a accessed by the data array address register 9 enters a parity checker 20 for parity check. Also, it is selected by the selector 16 to be supplied to the data register 18 and then set in the data bus 23.

From the instant when the address due to the request signal REQ1 is set in the data array address register 9, the next request signal REQ2 is supplied to the address arrays 2 and 2a, and the logical address signal is supplied to the MAP circuit 1. Then, comparison is done in the manner as described above. This time, the cache not hit signal is provided from the comparators 3 and 3a. This signal is supplied together with the output of the replace circuit 5 to the decision circuit 6. As a result, the data array 4 or 4a, whose data is interchanged with the data of the main memory 12 is determined, and the subject address is set in the address register 9.

While the cache hit signal is being supplied from the comparators 3 and 3a to the decoder 101 of the system controller 21, the terminal 32 of the decoder 101 is held at "high" by REQ and CODE signals supplied to the bus line 25a to set the flip-flop 103, to provide the readout designation execution signal DAF. This command DAF is supplied to the data arrays 4 and 4a, and the read-out data is set on the data bus 23 as noted above.

Likewise, when the request signal REQ2 is supplied, an acknowledge signal ACK2 is provided from the system controller 21. This time, a cache not hit signal is supplied to the decoder 101, whereby the terminal 33 of the decoder 101 is rendered to be "high" to set the flip-flop 104, thus providing the main memory read-out designation execution signal MMF.

The MMF signal having passed through the OR circuit 109 causes the signal BRQ to provide from the flip-flop 108 and also causes the negative logic signal MEMF to provide from the negative logic signal MEMF. This signal BRQ provides a memory request to the memory bus controller 11 to obtain the right of use of the memory bus 24 and also provides an access signal for data reading to the main memory 12. The signal MEMF shows that the main memory 12 is being accessed, and at the same time the gate 110 is controlled to inhibit the supply of the signal ACK from the flip-flop 102 to the CPU so as not to receive the signal REQ.

At the instant when the response BACK with respect to BRQ is returned from the memory bus controller 11 to the flip-flop 108, BEQ is reset. At the instant when the signal SYNC is returned from the memory bus controller 11, MEMF of the flip-flop 107 is reset. The signal SYNC is a synchronizing signal indicating that data is being provided from the main memory 12 to the memory bus 24 and that data has been conversely stored from the memory bus 24 to the main memory 12. During this time, i.e., during the period, during which BRQ is reset and SYNC is set, the AND gate 114 provides the signal BKWR for altering the data of the address arrays 2 or 2a and data arrays 4 or 4a (necessary for the renewal of the not hit). In this way, the address from the address register 10 is stored in the address array 2 or 2a, and data from the memory 12 on the memory bus 24 is supplied to the data array 4 or 4a.

When the MEMF is reset the system controller 21 receives the next REQ 3 and supplies ACK3 to the CPU for the execution of the operation of each of the cycles AA3 and DA3.

In the timing chart shown in FIG. 9, FIGS. 1 to 3 designate cycle orders of AA1, DA1, AA2, DA2, etc. When a data parity error is detected in the parity checker 20 during the DA1 cycle of REQ1→AA1→DA1, the signal TRAP is provided from the trap generation circuit 26. The CPU proceeds to the abnormality processing and machine check processing.

Figure 10:
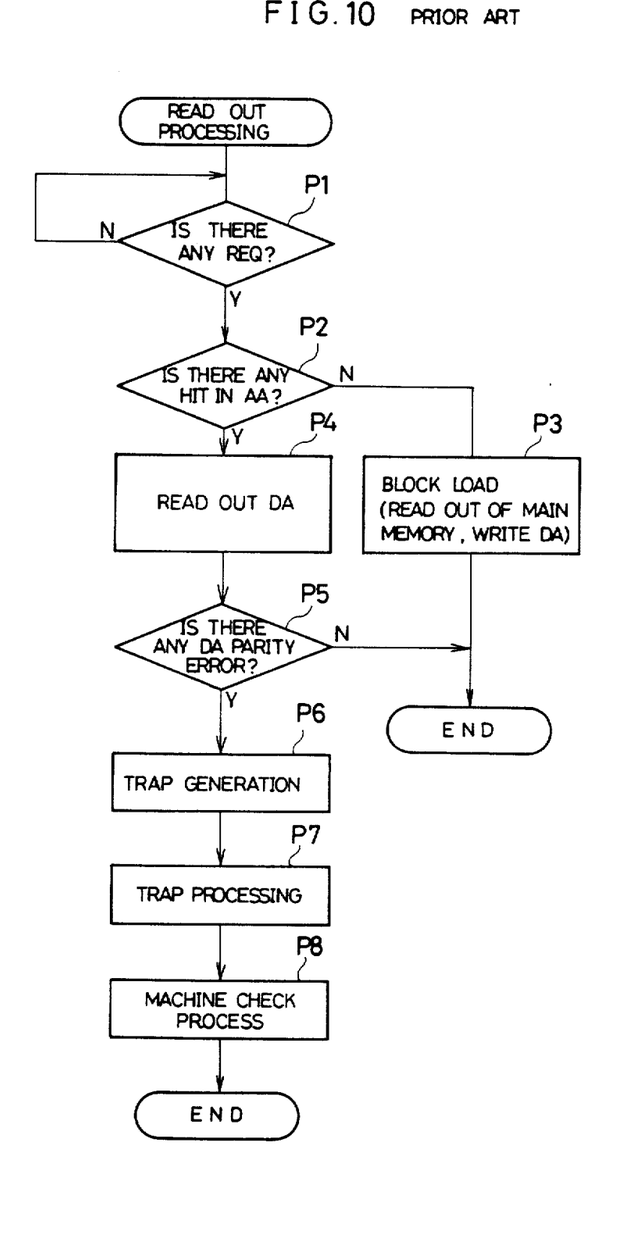
FIG. 10 is a flow chart for explaining the prior art operation.

When the flow of FIG. 10 is arranged, if there is REQ in a step P1, a check is done in a step P2 as to whether there has been a hit in the address arrays. If there is no hit, a step P3 is executed, and for the rewriting of the data array the data of the block unit is taken out from the main memory, and this data is loaded while expelling the old data. When there is a hit, a step P4 is executed, in which data array is read out, and in a step P5 the parity error check is done. If there is an error, a trap signal is generated in a step P6, a trap process is executed in step P7, and a machine check process is done in a step P8.

In the prior art cache memory, when a parity error is generated in the data array, the machine check process is given preference, the next cycle operation of the pipeline control is interrupted, so that it is impossible to make use of the function of the high speed processing cache memory.

SUMMARY OF THE INVENTION

The main object of the invention is to provide a cache memory, in which even if a one-bit error of the parity check system or a two-bit error of the ECC (error correction code) system is generated, the high speed operation can be continued by taking out data from the main memory.

Another object of the invention is to provide a cache memory for use in a data processing system including a central processing unit, a main memory connected to the CPU via address and data buses, and a memory bus controller connected to the main memory via a memory bus, which comprises an address conversion circuit for converting a logical address into the physical address, an address array, a comparator for comparing the physical address from the address array with the output of the address conversion circuit, a data array for storing data corresponding to the address in the address array, an address register for storing physical address from the address conversion circuit, a data array address register for storing address of the data array, an error detector for effecting error check of the data from the data array, a system controller for exchanging data with the memory bus controller and CPU, and an address back-up register for backing up an address register, in which the physical address of the data where errors are generated is stored, a data array address back-up register for storing data address of the data where errors are generated to back up the data array address register, and a request code back-up register for storing a preceding request code at the time of the error generation, the system controller serving to access data according to each back-up register when an error is detected.

The above and other objects, features and advantages of the invention will be more apparent from the following description when taken in conjunction with the accompanying drawings.

DESCRIPTION OF THE PREFERRED EMBODIMENTS

Now, an embodiment of the invention will be described with reference to the drawings.

Figure 1:
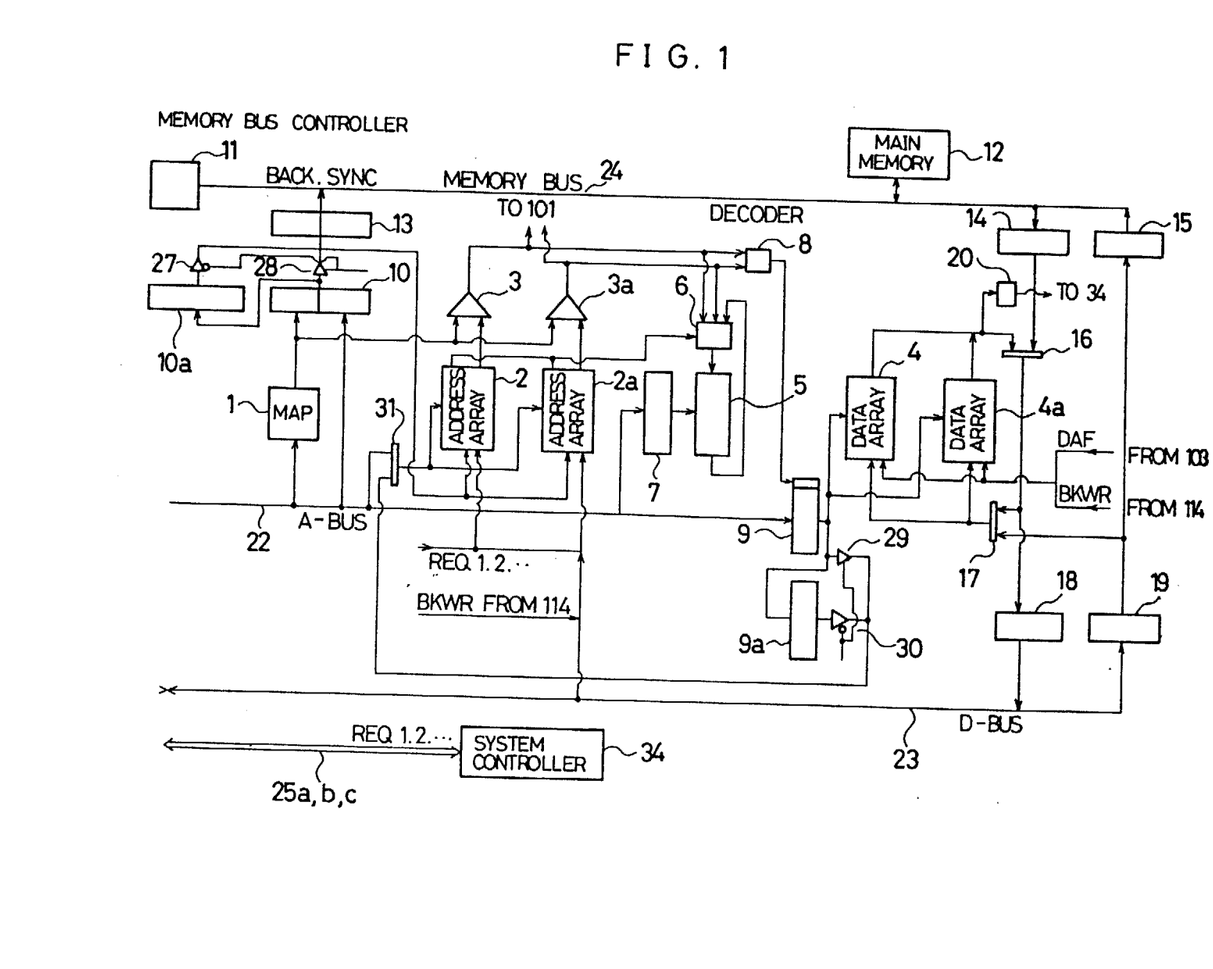
FIG. 1 is a block diagram showing a cache memory according to the invention.
Figure 2:
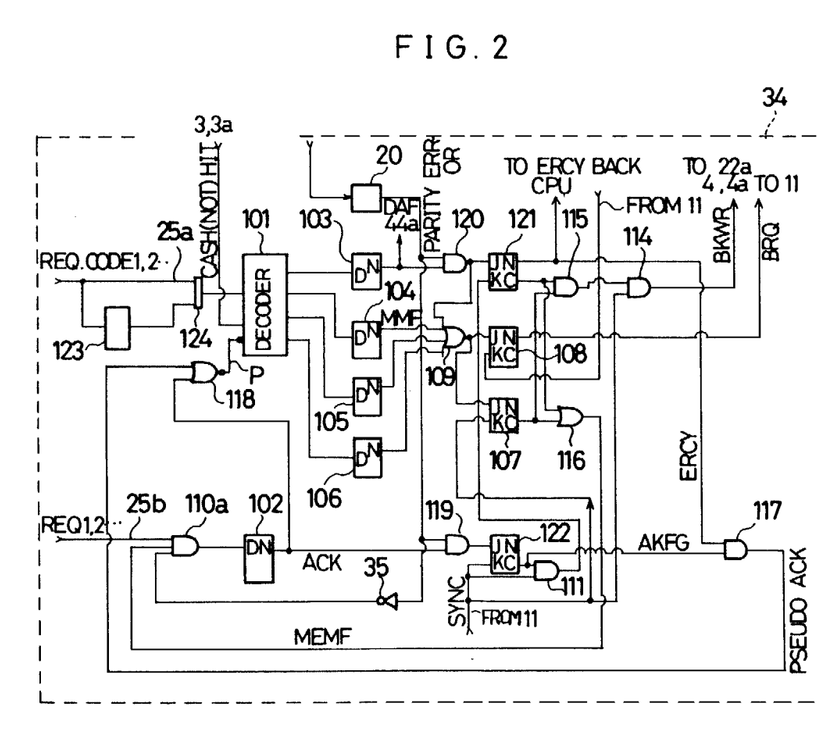
FIG. 2 is a detailed circuit diagram showing a system controller shown in FIG. 1.

FIG. 1 is a block diagram showing a main memory 12 connected to the CPU not shown and cache memories 2, 2a, 4 and 4a, and FIG. 2 is a detailed block diagram showing a system controller 34 shown in FIG. 1.

Referring to FIG. 1, reference numeral 1 designates a MAP circuit for converting logical addresses into physical addresses, and numerals 2 and 2a address arrays where physical addresses are stored. Numerals 3 and 3a designate comparators for comparing the output of the address arrays 2 and 2a respectively and the output of the MAP circuit (i.e., comparing physical addresses) to check if these addresses coincide. Reference numerals 4 and 4a designate data arrays where data corresponding to physical addresses of the address arrays 2 and 2a are stored. The address arrays 2 and 2a and data arrays 4 and 4a constitute a cache memory in a narrow sense.

Reference numeral 8 designates a decoder for generating, according to the output of the, comparators 3 and 3a, an address designating either data array 4 or 4a. Reference numeral 6 a decision circuit for deciding, according to the contents of the outputs of the comparators 3 and 3a and outputs of a replace array 5, either data array 4 or 4a in which to store the contents of a main memory 12 (data rewriting instruction). Numeral 7 designates an address register of the replace array 5.

Numeral 9 designates an address register for storing an address provided from the decoder 8 and provided from A-BUS 22. This address corresponds to the data in the data arrays 4 and 4a. Numeral 9a designates a data array address back-up register for backing up the contents of the data array register 9. Numeral 10 designates an address register for storing the physical address as the output of the MAP circuit 1, and numeral 10a an address back-up register for backing up the content of the address register 10.

Numerals 27, 28, 29 and 30 designate three-state buffers. The three-state buffers 27 and 28 selectively set either the output of the address register 10 or the output of the address back-up register 10a in a memory address register 13. Likewise, the three-state buffers 29 and 30 selectively write the output data of either the data array address register 9 or the data array address back-up register 9a in the address arrays 2 and 2a.

Part of the data of the main memory 12 is block loaded and stored in the data arrays 4 and 4a, and actual addresses (physical addresses) corresponding to these addresses are stored in the address arrays 2 and 2a. The reading of data from the CPU is done according to the imaginary (i.e., logical) address. Unless the converted physical address coincides with the physical address in the address arrays 2 and 2a, data of a high call factor and address thereof are extracted from the main memory 12 for replacing unnecessary data in the data arrays 4 and 4a and address arrays 2 and 2a. The main memory 12 is accessed through a memory bus 24 according to the physical address in the memory address register 13, and data read out from the main memory 12 is temporarily stored in the data register 14. The data written in the main memory 12 is temporarily stored in the data register 15 before being output to the memory bus 24. Numeral 16 designates a selector for providing either data from the main memory 12 or data from the data arrays 4 and 4a. Numeral 17 designates a selector for supplying either output data from the selector 16 or data from a writing data register 19 to the data arrays 4 and 4a. Numeral 18 designates a data register for temporarily storing output data of the selector 16. Numeral 19 designates a data register for storing written data. Numeral 20 designates a parity checker as an error detector. The parity checker 20 checks the parity error of data provided from the data arrays 4 and 4a. Numeral 34 designates a system controller for controlling the operation of the cache memory according to a request code and signal REQ, and numeral 23 is a data bus connected to the CPU.

FIG. 2 is a detailed block diagram of a system controller 34. A cache (not) hit signal from the comparators 3 and 3a is supplied to a decoder 101. The system controller 34 includes flip-flops 103 to 106 which are selectively driven by the decoder 101. The register 103 provides an execution instruction signal DAF for reading out data from data arrays 4 and 4a. The register 104 provides an execution instruction signal MMF for reading out data from the main memory 12. The register 105 provides an execution instruction signal DAS for writing data in the data arrays 4 and 4a. The register 106 provides an execution instruction signal MMS for writing data in the main memory 12. Numeral 109a designates a four-input OR circuit, to which the output of the register 103 is supplied through the AND gate 120 and also the outputs of the registers 104 to 106 are supplied, and the output of which constitutes a signal for instructing the execution of writing and reading data with respect to the main memory 12.

A register 107 consisting of a flip-flop and a bus request register 108 are set by the output of the OR circuit 109a, and the bus request register 108 provides a bus request signal BRQ to a memory bus controller 11. This signal BRQ is for obtaining the right of use of the data bus 24 and at the same time providing an access request to the main memory 12. The bus request register 108 is reset by a response signal BACK from the memory bus controller 11. A negative logic output of the register 107 is supplied to an AND gate 115 and an OR gate 116, and the register 107 is reset by a signal SYNC provided from the memory bus controller 11. This signal SYNC is a synchronizing signal for indicating the completion of the reading of data from the main memory 12 to the memory bus 24 and also completion of the writing of data from the memory bus 24, and usually it is provided after the signal BACK.

The output of the parity checker 20 is supplied to AND gates 119 and 120 of the system controller 34 and inverter 35. The register 121 is set by the output of the AND gate 120 to provide an error cycle signal ERCY. The signal ERCY indicates that an error recovery process is being executed with generation of a parity error, and it is supplied to the CPU.

The register 122 is set by a negative logic of the AND gate 119 to provide a signal AKFG. The signal AKFG indicates that the DA cycle has not been executed although an AA cycle to be described later has been completed, and it is supplied to AND gates 111 and 117. When the AND gate 111 receives the signals SYNC and AFKG, it provides a "high" signal to reset the register 121.

According to the signal SYNC and the output of the OR gate 115 the AND gate 114 provides the signal BKWR to the address arrays 2 and 2a and data arrays 4 and 4a. The signal BKWR represents a timing of data writing for updating the contents of the above data.

The AND gate 117 provides a pseudo ACK according to the signals ERCY and AKFG. The pseudo ACK is a signal indicating the resumption of DA cycle having been interrupted due to generation of the parity error.

The negative logic output of the register 121 is supplied to the AND gate 115 and OR gate 116. The negative logic output of the register 107 is a signal MEMF. The signal MEMF indicates that the main memory 12 is being accessed and also serves to inhibit the generation of the ACK signal so as not to accept the REQ signal. The signal MEMF having passed through the OR gate 116 and an error signal having been inverted by the inverter 35 are supplied to a three-input AND gate 110a.

A signal REQ is supplied from the CPU to the AND gate 110a. This signal REQ is a memory access request signal from the CPU to the cache memory. The output of the AND gate 110a serves to set the register 102 to provide the signal ACK. The signal ACK is provided in corresponding to the signal REQ under predetermined conditions, and it is supplied as a gate control signal to the AND gate 119 and the NOR gate 118.

The NOR gate 118 provides a negative OR signal P from the signals ACK and pseudo ACK. The output P is a signal for causing enabling the decoder 101 to cause the cache memory to execute the DA cycle.

Numeral 123 designates a back-up register for backing up a request code supplied to a bus line 25a. Numeral 124 designates a selector, the output of which is supplied to a decoder 101.

Now, the operation of the above embodiment will be explained with reference to the timing chart shown in FIG. 3.

When the signal REQ1 is supplied from the CPU to the cache memory and system controller 34, the cache memory enters a AA1 cycle. A logical address is supplied from the CPU to the bus line 22 (A-BUS). This logic address is supplied to the MAP circuit 1 and the address arrays 2 and 2a.

The physical address provided from the MAP circuit 1 and physical address read out from the address arrays 2 and 2a are compared in the comparators 3 and 3a. When a cache hit signal provided from the comparators 3 and 3a, the physical address from the MAP circuit 1 is stored in the address register 10.

Figure 3:
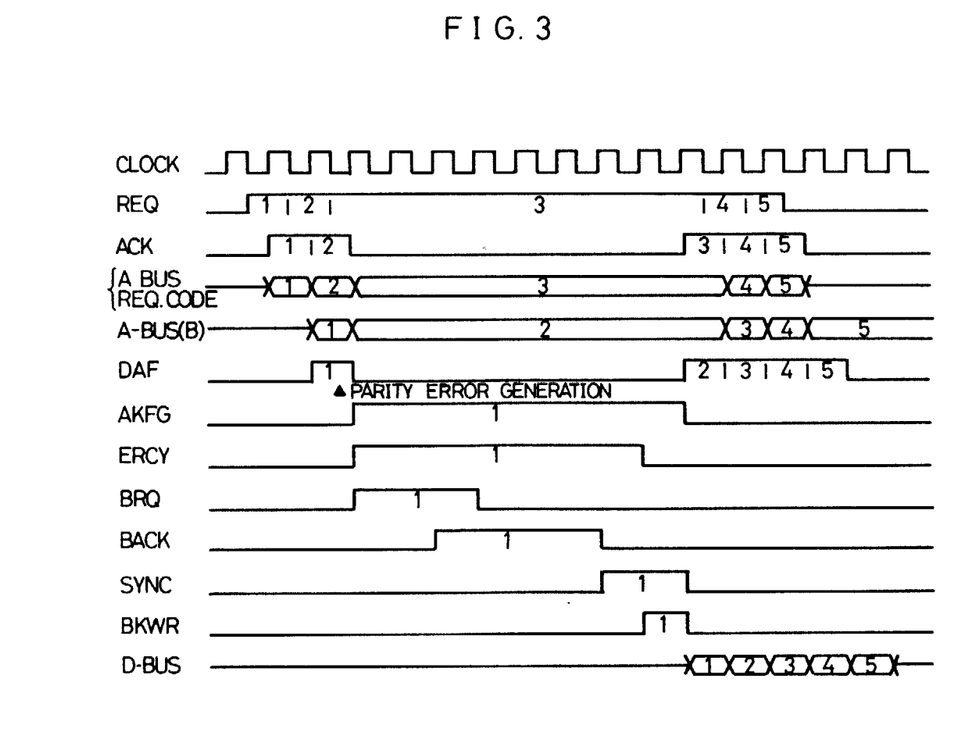
FIGS. 3 and 4 are timing chart and a flow chart for explaining the operation according to the invention.

Then, in the cache memory the AA1 cycle of the signal REQ1 enters the DA1 cycle, as shown in FIG. 3 and at the same time the CPU starts the AA2 cycle of REQ2 for providing the next REQ2 signal and logical address. The data address provided from the bus line 22 (A-BUS) is stored in the data address register 9.

In the DA1 cycle the data arrays 4 and 4a are accessed according to the output address of the data address register 9, and the data therefrom is supplied to the data register 18 through the parity checker 20 and selector 16. When a parity error is generated in the DA1 cycle parity checker 20, the AA2 cycle of the next REQ2 can not proceed to the next DA2 cycle (access of the data arrays 4 and 4a). However, although the REQ1 completes the DA1 cycle because of the generation of the error, at this instant the physical address of the AA1 cycle of REQ1 is shifted from the address register 10 to the address back-up register 10a. At the same time, the data address is shifted from the data address register 9 to the data array address back-up register 9a. Then, the physical address of the AA2 cycle of the REQ2 is stored in the empty address register 10, and physical address comparison of REQ2 is done in the comparators 3 and 3a, and data address from the line bus 22 (A-BUS) is stored in the data array address register 9. Further, REQ and CODE supplied to the bus line 25 are stored in the back-up register 123.

In the system controller 34 the register 121 is set by the AND gate 120 under conditions of the parity error generation of REQ1 and cache hit (Parity error and DAF are positive), thus providing ERCY. The CPU thus enters an error recovery cycle. The error recovery cycle is such that in the DA1 cycle of REQ1 the content of the data array 4 or 4a in which the parity error is generated (data) and contents (address data) of the corresponding address array are rendered ineffective, and data corresponding to the address is taken out from the main memory 12 to be rewritten as block load. (degradation)

In order to show that the DA2 cycle of REQ2 has not yet been executed, the register 122 is set by the AND gate 119 under the conditions of the parity error generation and ACK condition, thereby providing AFKG. Further, the register 108 is set to provide BRQ, whereby BACK is returned as an answer from the memory bus controller 11 to the system controller 34.

Then, SYNC is supplied from the system controller to the registers 108 and 122 and AND gate 111, and data of REQ1 corresponding to the DA1 cycle is read out from the main memory 12 to the memory bus 24.

In the error recovery cycle, the following is executed. More specifically, data of the DA1 cycle of ERQ1 where there has been an error is supplied from the memory bus 24 through the data register 14 and 18 to the D-BUS 23.

In the AA1 cycle of REQ1, the address arrays 2 and 2a where there has been cache hit are degraded. To this end, the address arrays 2 and 2a are accessed through the selector 31 by using the address in the data array address back-up register 9a. What is generally called degradation bit may be set in the address arrays 2 and 2a to prevent cache hit. Then, the DA2 cycle of REQ2 which has not been executed is executed. The AND gate 117 of the system controller 34 provides pseudo ACk by ANDing ERCY and AKFG. The pseudo ACK is supplied through the NOR circuit 118 to the decorder 101 to permit operation of the decoder 101. The decoder 101, which has received REQ and CODE of REQ2 in the request code back-up register 123 through the selector 124, supplies a signal DAF or MMF or DAS or MMS to the registers 103 to 106, thus causing execution of the DA2 cycle.

In the system controller 34 ERCY is reset under SYNC input condition (FIG. 3), and BKWR is set by the negative logic of ERCY and condition of SYNC. After the resetting of BKWR normal state is recovered, and the cache memory receives REQ3 and logical address and executes AA3 and DA3 cycles.

Figure 4:
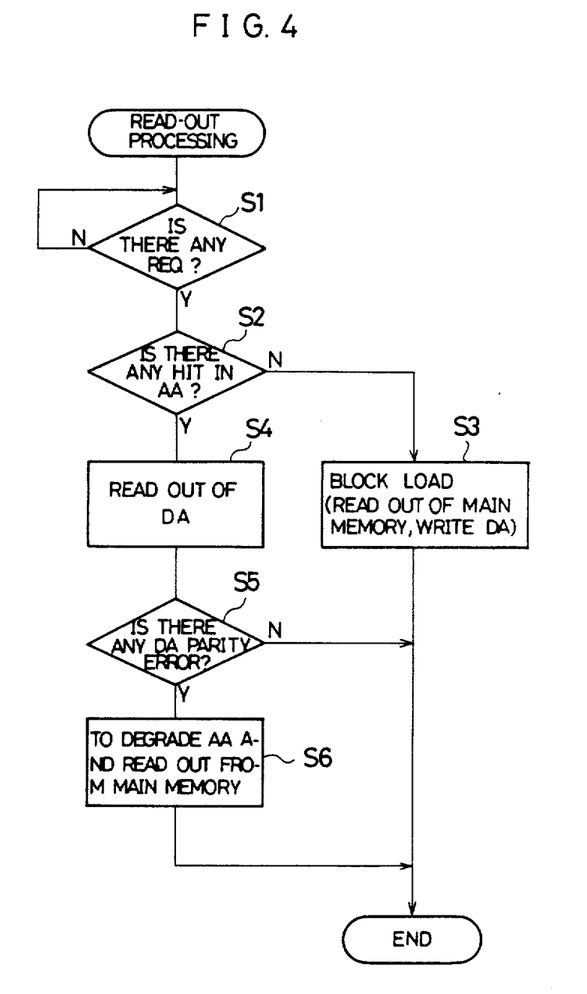

When the operation so far is rearranged in the flow chart of FIG. 4, in the process of reading out data from the cache memory, if it is found in a step S1 that there is REQ, a check is done in a step S2 as to whether there is a hit in the address arrays. If there is no hit, a step S3 is executed, in which data arrays are rewritten. More particularly, data in the block unit is taken out from the main memory, and this data is loaded by expelling old data.

When a hit is found, a step S4 is executed to read out data from the data arrays. In a step S5 the parity error check is done. If the parity error is generated, a step S6 is executed, in which right data is taken out from the main memory to cause degradation of the address arrays. Then, a state of accepting the next REQ is recovered, and pipe line control of the cache memory is done.

The above embodiment has concerned with the instant of parity error generation. However, the same effects may also be obtained at the time of generation of such error as ECC 2-bit error (error correction code). Further, the address conversion is done through the MAP system. However, the same effects may also be obtained by the same TLB system.

As has been described in the foregoing, according to the invention, even if a parity error or ECC 2-bit error is generated in the data of the data arrays during pipeline control process by the system controller in the cache memory, the data can be taken out from the main memory without interrupting the pipeline control operation and obtain continual normal operation of the system. Thus, it is possible to provide a high speed and highly reliable cache memory.

While a preferred embodiment of the invention has been described using specific terms, such description is for illustrative purpose only, and it is to be understood that changes and variations may be made without departing from the spirit and scope of the following claims.

What is claimed is:

1. A non-interruptive, pipelined cache memory for use in a data processing system including a central processing unit and a main memory connected to said central processing unit via a system bus, which comprises:
   an address converter connected to said address bus for converting a logical address into a physical address;
   at least one address array for storing a physical address from said main memory;
   at least one data array for storing data from said main memory corresponding to said physical address stored in said address array;
   an address register for storing a physical address from said address converter;
   a data array address register for storing a data address of data stored in said data array;
   at least one comparator for comparing a physical address from said address converter with a physical address from said address array to produce either a cache hit signal which causes said data in said data array to be read out on said system bus or a cache miss signal which causes a block of data to be loaded in said data array from said main memory;
   an error detector for detecting generation of an error in data from said data array and generating an error signal at detection;
   address back-up register means connected to said address register for storing a physical address of said data from said data array in response to said error signal;
   data array address back-up register means connected to said data array address register for storing a data address of said data from said data array in response to said error signal; and
   a system control unit which comprises means for enabling the transfer of said physical address from said address register to said address back-up register means and said data address from said data array register to said data array address back-up register means and means for enabling a physical address of a next request to be stored in said address register now empty and a data address of said next request to be stored in said data array address register so that data is read out of said main memory without interrupting a pipeline operation of said cache memory.

2. The cache memory of claim 1, which further comprises control, error recovery cycle and pseudo acknowledge registers arranged such that said data is read out of said main memory in response to said error signal.

3. The cache memory of claim 1, wherein said address back-up register means comprises an address back-up register connected in parallel with said address register.

4. The cache memory of claim 1, wherein said data array address back-up register means comprises a data array address back-up register connected in parallel with said data address register.

5. The cache memory of claim 3, wherein said address back-up register means comprises:
   a memory address register connected to said main memory via a memory bus; and
   three-state buffer means connected at its input to both said address register and said address back-up register and at its output to said memory address register so as to selectively set said physical address of said address back-up register in said memory address in response to said error signal so that said main memory is accessed according to said physical address in said memory address register in response to said error signal.

6. The cache memory of claim 4, wherein said data array address back-up register means comprises three-state buffer means connected at its input to both said data array address register and said data array address back-up register and at its output to said address array so as to selectively write an output of said data array address back-up register in said address array in response to said error signal.

7. A non-interruptive, pipelined cache memory for use in a data processing system which includes a central processing unit and a main memory connected to said central processing unit via a system bus, which comprises:
   an address converter connected to said address bus for converting a logical address into a physical address;
   at least one address array for storing a physical address from said main memory;
   at least one data array for storing data from said main memory corresponding to said physical address stored in said address array;
   an address register for storing a physical address from said address converter;
   a data array address register for storing a data address of data stored in said data array;
   at least one comparator for comparing a physical address from said address converter with a physical address from said address array to produce either a cache hit signal which causes said data in said data array to be read out on said system bus or a cache miss signal which causes a block of data to be loaded in said data array from said main memory;
   an error detector for detecting generation of an error in data from said data array and generating an error signal at detection;
   address back-up register means connected to said address register for storing a physical address of said data from said data array in response to said error signal;
   data array address back-up register means connected to said data array address register for storing a data address of said data from said data array in response to said error signal;
   request code back-up register means connected to said system bus for storing REQ and CODE signals in response to said error signal; and
   a system control unit which comprises means for enabling the transfer of said physical address from said address register to said address back-up register means and said data address from said data array register to said data array address back-up register means and means for enabling a physical address of a next request to be stored in said address register now empty and a data address of said next request to be stored in said data array address register so that data is read out of said main memory without interrupting a pipeline operation of said cache memory.

* * * * *